(12) United States Patent
Rodriguez Bravo et al.

(10) Patent No.: US 10,594,855 B2
(45) Date of Patent: Mar. 17, 2020

(54) MOBILE DEVICE FEATURE DISABLEMENT

(71) Applicant: INTERNATIONAL BUSINESS MACHINES CORPORATION, Armonk, NY (US)

(72) Inventors: Cesar Augusto Rodriguez Bravo, San Rafael de Alajuela (CR); Erik Rueger, Ockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/812,134

(22) Filed: Nov. 14, 2017

(65) Prior Publication Data

US 2019/0149652 A1    May 16, 2019

(51) Int. Cl.
*H04W 4/02* (2018.01)
*H04M 1/725* (2006.01)
*H04W 4/021* (2018.01)
*H04W 48/04* (2009.01)

(52) U.S. Cl.
CPC ....... *H04M 1/72577* (2013.01); *H04W 4/021* (2013.01); *H04W 48/04* (2013.01)

(58) Field of Classification Search
CPC ......... H04M 1/72577; H04M 2250/02; H04M 2250/10; H04W 48/04; H04W 4/029; H04W 4/21; H04W 88/06
See application file for complete search history.

(56) References Cited

U.S. PATENT DOCUMENTS

| | | | |
|---|---|---|---|
| 6,738,572 B2 | 5/2004 | Hunter | |
| 8,219,144 B2 | 6/2012 | Benco et al. | |
| 8,494,591 B2 | 7/2013 | Bocking et al. | |
| 8,683,556 B2 | 3/2014 | Ingrassia, Jr. et al. | |
| 9,167,389 B1 | 10/2015 | Murchison et al. | |
| 9,628,609 B2 | 4/2017 | Allen et al. | |
| 2005/0012532 A1* | 1/2005 | Mehta | G06F 9/44 327/155 |

(Continued)

FOREIGN PATENT DOCUMENTS

| | | |
|---|---|---|
| CA | 2836250 A1 | 6/2014 |
| WO | 2009105125 A1 | 8/2009 |

(Continued)

OTHER PUBLICATIONS

Ghosh, D., et al., "Privacy control in smart phones using semantically rich reasoning and context modeling", IEEE CS Security and Privacy Workshops, 2012, pp. 81-85.

(Continued)

*Primary Examiner* — Quan M Hua
(74) *Attorney, Agent, or Firm* — Michael O'Keefe; Matthew M. Hulihan; Heslin Rothenberg Farley & Mesiti PC (57) ABSTRACT

Mobile device feature disablement is provided through a method that identifies, by a mobile device, a mobile device feature of which usability is to be disabled. The method includes identifying one or more hardware devices of the mobile device that the mobile device feature relies on for proper usability of the feature. The method also includes disabling, by the mobile device, one or more drivers of the one or more hardware devices, the disabling the one or more drivers disabling usability of the mobile device feature.

17 Claims, 6 Drawing Sheets

(56) References Cited

U.S. PATENT DOCUMENTS

| | | | |
|---|---|---|---|
| 2005/0198512 A1* | 9/2005 | Kline | G06F 21/604 |
| | | | 713/182 |
| 2005/0255874 A1 | 11/2005 | Stewart-Baxter et al. | |
| 2005/0277428 A1* | 12/2005 | Nathan Brown | H04M 1/72577 |
| | | | 455/456.3 |
| 2006/0160562 A1 | 7/2006 | Davis et al. | |
| 2010/0056181 A1* | 3/2010 | Rippon | H04W 8/22 |
| | | | 455/456.3 |
| 2011/0105097 A1 | 5/2011 | Tadayon et al. | |
| 2014/0073307 A1* | 3/2014 | Zhang | H04W 80/00 |
| | | | 455/418 |

FOREIGN PATENT DOCUMENTS

| | | | |
|---|---|---|---|
| WO | 2009105666 A1 | 8/2009 | |
| WO | 2016196496 A1 | 12/2016 | |

OTHER PUBLICATIONS

Ryoo, J., et al., "Geo-Fencing: Geographical-Fencing based Energy-Aware Proactive Framework for Mobile Devices", IEEE, 2012, 9 pgs.

Castillo, J., et al., "Developing a User Identification Mechanism for Secure Mobile Phone Access Replacing the Tedious Username/Password", 8 pgs.

Mell, Peter, et al., "The NIST Definition of Cloud Computing", NIST Special Publication 800-145, Sep. 2011, Gaithersburg, MD, 7 pgs.

List of IBM Patents or Applications Treated as Related, Oct. 30, 2019, 2 pgs.

"Mobile Device Feature Disablement", U.S. Appl. No. 16/575,458, filed Sep. 19, 2019, pp. 1-35).

* cited by examiner

MOBILE DEVICE FEATURE DISABLEMENT

BACKGROUND

The massive use of smartphones and other mobile devices having increasingly advanced capabilities for connectivity, content creation, and sharing/streaming of video and audio can pose a threat to some companies, locations, governments, or other entities that have special desires or restrictions with respect to privacy and security. Measures may be taken to prevent certain mobile device activities at a location. For instance, some venues install signal jammers that can block signals (global positioning system, cellular data, voice data, etc.) from emanating from a mobile device. These signal jammers fail to limit features that are self-contained to the mobile device, for instance use of camera devices and audio recording applications, which would remain active and usable. Additionally, signal jammers tend to be strictly regulated and therefore may not be available for use in many situations.

SUMMARY

Shortcomings of the prior art are overcome and additional advantages are provided through the provision of a computer-implemented method. The method includes identifying, by a mobile device, a mobile device feature of which usability is to be disabled. The method also includes identifying one or more hardware devices of the mobile device that the mobile device feature relies on for proper usability of the feature. Further, the method includes disabling, by the mobile device, one or more drivers of the one or more hardware devices, the disabling the one or more drivers disabling usability of the mobile device feature.

Further, a computer program product including a computer readable storage medium readable by at least one processor and storing instructions for execution by the at least one processor is provided for performing a method. The method includes identifying, by a mobile device, a mobile device feature of which usability is to be disabled. The method also includes identifying one or more hardware devices of the mobile device that the mobile device feature relies on for proper usability of the feature. Further, the method includes disabling, by the mobile device, one or more drivers of the one or more hardware devices, the disabling the one or more drivers disabling usability of the mobile device feature.

Yet further, a computer system is provided that includes a memory and a processor in communication with the memory, wherein the computer system is a mobile device configured to perform a method. The method includes identifying, by the mobile device, a mobile device feature of which usability is to be disabled. The method also includes identifying one or more hardware devices of the mobile device that the mobile device feature relies on for proper usability of the feature. Further, the method includes disabling, by the mobile device, one or more drivers of the one or more hardware devices, the disabling the one or more drivers disabling usability of the mobile device feature.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities to effectively block the usability of certain mobile device features and related applications, drivers, and firmware, in controlled areas. Many mobile device features rely on underlying hardware for feature usability. For instance a 'camera' feature, accessible via a camera application of a smartphone, relies on access to the camera hardware of the smartphone. The blocking or disabling of a feature in accordance with aspects described herein at least temporarily disables the driver(s) and/or firmware of the underlying hardware, thereby preventing application(s) through which those features are used from functioning properly to achieve the desired functions. The disabling of a feature may be geolocation and/or proximity-based, in some embodiments described herein.

As an example, aspects can be used to automatically control connectivity of mobile devices on an airplane, in which an 'airplane mode' is forced for a mobile device that enters the airplane and is disabled when the device exits the airplane. One or more transmitters, such as those based on the Bluetooth Low Energy (also referred to as Bluetooth LE, BLE, or Bluetooth Smart) technology may transmit a 'disable' signal to mobile devices entering the aircraft and an 'enable' signal to the mobile devices when exiting the aircraft (BLUETOOTH is a registered trademark of Bluetooth Special Interest Group, Kirkland, Wash., U.S.A.). The disable signal in this example is sent to disable certain functionality. The disabling of that functionality effectively places the phone into (i.e. enable) the 'airplane mode' of the device. The 'enable' signal transmitted to the device when it exits the plane can re-enable that prior-disabled functionality, effectively disabling the airplane mode. This example uses a proximity-based (i.e. proximity relative to the plane) approach to trigger the mobile device feature control.

As another example, aspects can be used to automatically disable the camera functionality of mobile devices when entering sensitive areas, such as banks or military installations. This may be proximity-based, as above, or alternatively could be geolocation-based, i.e. using Global Positioning System (GPS) geolocation information from the GPS radio of the mobile device.

Aspects restrict and disable usability of mobile device features based on device location by disabling hardware drivers of the underlying hardware, thereby disabling the mobile operating system's ability (and therefore the ability of mobile applications) to interact with the hardware. This is in contrast to other approaches that disable individual applications or all user features of the mobile device, as examples. Instead, aspects described herein disable a feature by disabling the driver(s) of hardware device(s) that the mobile device feature relies on for proper usability of the mobile device feature. Provided is the ability to perform any of several different actions over any of several different types of hardware and software (drivers) of the mobile device. This approach of disabling the underlying hardware is more secure, reliable, and practical because it cannot be overcome by the user installing a different application (one which was not explicitly disabled), but still allows for usage of other mobile device features of the mobile device. Additionally, using geolocation or proximity as a trigger helps to easily deploy the solution and select places/areas for restricted feature use.

Additional details are presented and illustrated with reference to FIG. 1, which depicts an example environment to incorporate and user aspects described herein. Environment 100 includes a mobile device 102, examples of which include but are not limited to a smartphone, tablet computer, laptop, or wearable mobile device. A self-contained control module or other facility that executes on the mobile device can perform some aspects described herein. In this regard, with the exception of a disable signal transmitted from an external transmitter, mobile feature disablement may be implemented on the mobile device itself, instead of relying on, for example, code running on a remote facility to authoritatively dictate feature disablement.

The control module could, as one example, be built into a kernel or other component of the mobile device operating system installed on the mobile device. Alternatively, the control module could be installed separately as a mobile application with 'root' privileges to perform actions that disable the desired drivers. The approach that integrates the control module into the mobile device operating system may have an advantage that it allows for more secrecy, compatibility, and operating system integration and control over the operations of the control module than does the separate application approach. The separate application approach has an advantage that it would more easily allow third parties to develop and dictate the control module functionality. Additionally or alternatively, the control module may be provided as enterprise-required software that employees or other affiliates are required to install on their mobile devices to give the enterprise control over mobile device features.

The control module can start automatically when the mobile device boots and run in the background, e.g. with root privileges. Additionally the GPS hardware of the mobile device may be enabled on boot.

Then, geofencing can be used as a trigger to disable the desired driver(s) to disable correlated mobile device features, based on the particular configuration. Various approaches can be used to disable to driver(s). For example, the operating system may have an option to enable/disable drivers. Alternatively, a standalone application with proper privileges could be given some authority to enable/disable drivers of the mobile device for the subject hardware. In some embodiments, disabling the driver renders the operating system at least temporarily unable to communicate with the subject hardware device(s) for usability of the mobile device feature.

Upon a triggering event, hardware device(s) that a target mobile device feature relies on for proper usability of a mobile device feature are identified. Then, the mobile device disables driver(s) of the hardware device(s), the disabling the driver(s) disabling usability of the mobile device feature. The hardware devices can be any desired hardware of the mobile device. Examples include but are not limited to: camera(s), microphone(s), GPS antenna(s), cellular radio(s)/modem(s), WiFi, Bluetooth, and other wireless adapter(s), near-field communication chip(s), as examples.

As noted, the disablement may be triggered based on location of the mobile device. Referring again to FIG. 1, a geofence 104 is identified by a dashed circle. Although the geofence is largely circular in this example, it may be of any desired shape and dimension in other examples. It could, for instance, surround a building, corresponding to the perimeter and shape thereof.

One example of a geofence is established based on a radius from a central location, e.g. point 106 in this example. Point 106 could correspond to particular geographic coordinates or other GPS location. It could correspond to a larger region or area, such as a building. In any case, a geolocation-based triggering event may be raised by the mobile device when it senses its GPS location reaches the geofence 104 or it move to within the radius of point 106, illustrated by the geofence 104. For instance, responsive to the mobile device 102 reaching point 108, the event may be triggered to identify a feature to disable. The mobile device may store list of features to be disabled by various geolocations. Periodically or aperiodically, the mobile device queries a geolocation of the mobile device and checks its location against the list of locations. If the mobile device is located at or within a location for which a feature is to be disabled, the mobile device identifies and disables the corresponding feature(s).

Figure 1:
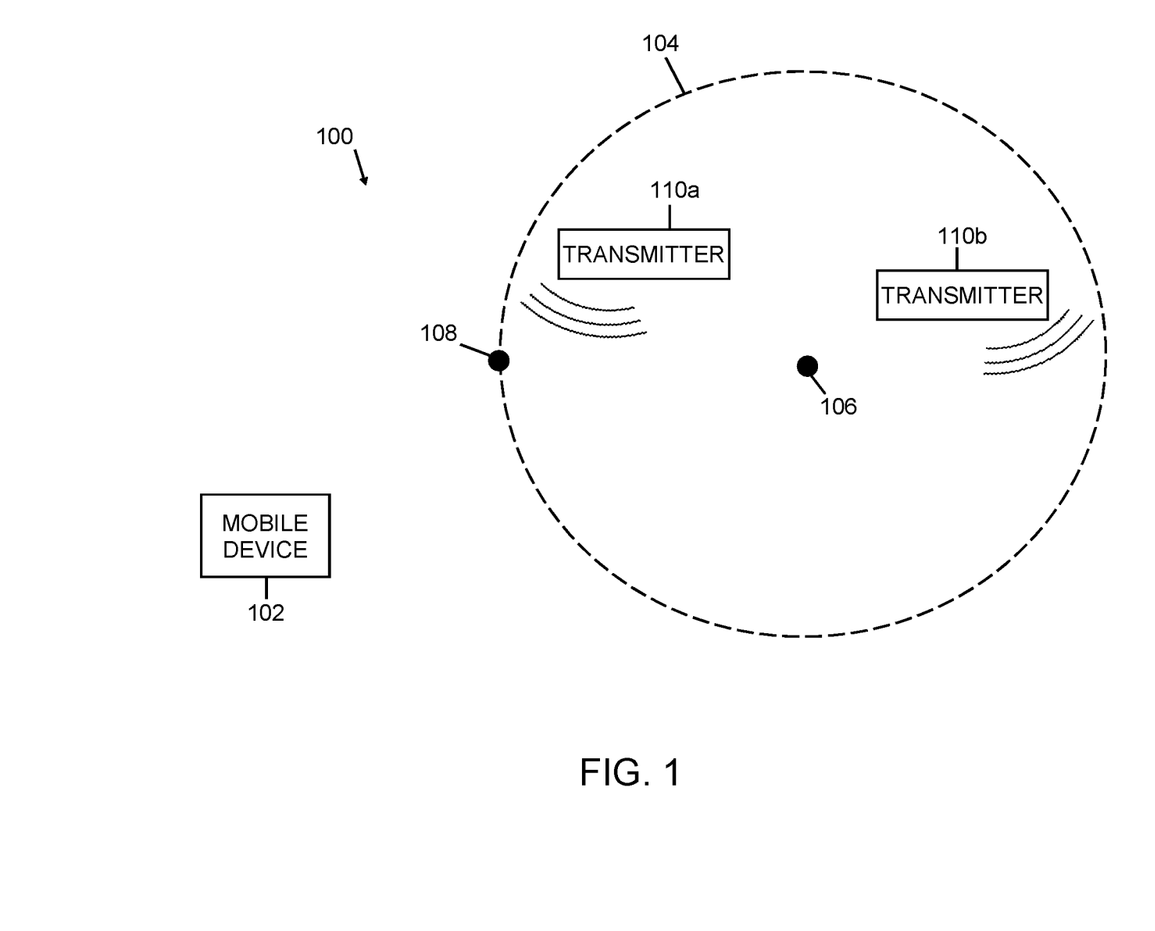
FIG. 1 depicts an example environment to incorporate and use aspects described herein.

FIG. 1 also depicts another embodiment in which transmitters 110a and 110b are positioned in an area and transmit signals to define the fence 104. Here, rather than relying on GPS coordinates of the mobile device, the mobile device, upon reaching point 108 (or elsewhere within the fence 104), may receive a transmitted signal from a transmitter 110a, 110b that triggers the identification of the mobile device feature for disablement of the correlated hardware devices. It is noted that both the geolocation-based triggering using GPS coordinates and the proximity-based triggering using transmitters are depicted in FIG. 1 for purposes of illustration, however the two could be used separately or together.

Taking an example in which a concert venue desires to disable video recording equipment/functionality for concert-goers, the geofence 104 of FIG. 1 can correspond to an area of or surrounding the concert venue, and aspects described herein can function to disable camera drivers of a mobile device when it enters the concert venue (enters the area defined by 104) and enable the camera drivers of the mobile device when it exits the venue (leaves the area defined by 104).

It is noted that although a trigger may be based on a signal from a device (e.g. transmitter) external to the mobile device, it is the mobile device itself, e.g. by way of the control module, that decides to disable the feature and hardware, and that implements that decision. This is done absent/without dependence on a network service provider or other provider of services to the mobile device to authoritatively decide to disable the feature. It is noted, however, that the control module may be configured to authoritatively decide to disable a feature when the mobile device receives a signal identifying a feature to be disabled.

In some examples, a feature to be disabled implicates a group of hardware, and therefore corresponding drivers, to disable in order to disable the feature. An example is Internet or network connectivity of a device. It may be desirable to disable internet service on a smartphone entering a government building, for instance. The device may be triggered to disable such a feature. In other words, a signal from a transmitter may signal mobile devices that enter the building to 'disable Internet'. Each individual mobile device may hold a respective configuration that indicates, for that particular device, which hardware is to be disabled to disable the Internet feature. On many mobile devices, this will implicate the WiFi and cellular hardware, as well as the Bluetooth hardware. Camera hardware is unlikely to be usable for internet access, therefore the camera hardware may remain enabled unless otherwise disabled.

Accordingly, a mobile device can identify from a received command/signal the mobile device feature to disable and then identify the hardware device(s) based on correlating the identified mobile device feature to the hardware device(s) using a set of correlations that the mobile device maintains. The correlations may be correlations between mobile device features and hardware of the mobile device.

Figure 2:
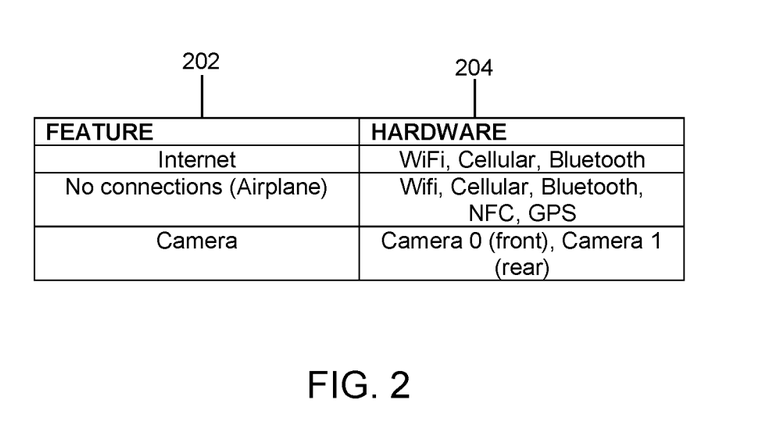
FIG. 2 depicts an example set of correlations between mobile device features and hardware of the mobile device, in accordance with aspects described herein.

FIG. 2 depicts an example set of correlations between mobile device features and hardware of the mobile device, in accordance with aspects described herein. The correlations may be specific to the given mobile device on which the correlations are stored, which in some examples are stored as a data structure on the mobile device. FIG. 2 presents a table listing mobile device features (column 202) and correlated hardware (column 204). The hardware correlated to a feature indicates the hardware that is to be disabled in order to disable the feature.

When a trigger occurs to disable a feature, the mobile device identifies, from the table, the hardware correlated to that feature, and disables the corresponding drivers for that hardware. In the example of FIG. 2, the listed features are: (i) 'Internet' (correlated to WiFi, cellular, and Bluetooth adapters—all being hardware that could be used to access the Internet); (ii) 'No connections' (also known as Airplane Mode, correlated to WiFi, cellular, Bluetooth, NFC, GPS hardware); and (iii) 'Camera' (correlated to the two cameras—forward facing and rear facing—of the mobile device).

It is noted again that the correlations may be specific to the particular mobile device, as different mobile devices may have different hardware. One mobile device may have one cellular radio and another mobile device may have multiple cellular radios, for instance. The correlations stored on each mobile device will be therefore be different.

In embodiments that rely on proximity sensing, e.g. radio-frequency, near-field, Bluetooth LE, etc. to trigger feature disablement, emitters/transmitters may send a specific signal, recognized by the mobile device and more particularly the control module thereof, to disable specific feature(s) of the mobile device. The mobile devices have logic built-in that identifies what is to be done to disable those feature(s). Accordingly, a proximity-based triggering event, for instance a 'disable camera' signal, may serve as the basis for the mobile device to identify the mobile device feature to be disabled, where the mobile device receives from a transmitter a command or other signal that identifies the mobile device feature to be disabled. Signal transmitters may leverage an applicant programming interface (API) to send a signal to mobile devices to convey which feature(s) are to be disabled.

In some examples, the signal broadcast to a mobile device from a transmitter explicitly identifies a feature to be disabled. In other examples, the transmitter broadcasts a code or other identifier that the mobile device receives and uses to decide which feature is to be disabled. To make that decision, the mobile device performs a check for which feature(s) to disable based on the transmitted identifier(s). Identifiers can be associated with features, and this information can be loaded in a local database on the mobile device (which is updated periodically or aperiodically) and/or a cloud service that the mobile device access. In this manner, some decision-making in terms of the specific feature(s) to disable are performed by the mobile device, perhaps with guidance with local and/or cloud identifier-feature association information, which can have advantages in terms of implementation and management of the solution.

It may be the case that transmitters are setup to define a periphery of an area within which feature(s) are to be disabled. When a mobile device enters the area through the perimeter, the mobile device may be configured to receive a signal transmitted to it from a transmitter and disable the requested feature(s). In light of this, a user may attempt to prevent such disablement by turning off the mobile device or otherwise preventing the mobile device from receiving or acting on the signal from the transmitter when the user enters the area with the mobile device. The user might later turn on the mobile device or otherwise attempt to use a feature that is intended to be disabled for that area. In this scenario, it may be desired to force the mobile devices (e.g. by way of the control module) to, whenever a request is made for a given hardware device, perform GPS and/or proximity sensing and any feature disablement triggering event recognized from that GPS/proximity sensing. Additionally, there may be a requirement of a handshake or other acknowledgement between the mobile device and a transmitter or controller that any applicable disable signals have been received by the mobile device. Thus, based on an attempt by the mobile device to access hardware thereof, there may be a check for commands/signals from a transmitter or for a GPS-related triggering event, which could then cause a proximity-based or geolocation-based triggering event to be raised based on the checking, in response to the attempt by the mobile device to access the hardware.

As an enhancement, the disabling of a feature could additionally disable application(s) that provide the user use of that feature. An example application to disable would be the mobile device's internet browser(s) when the feature to be disabled is Internet connectivity.

Aspects described herein distinguish over distributed systems that rely on a remote device for the disabling. An example is a wireless cellular provider disabling cellular service based on, for instance, geolocation of the cell phone. Such approaches require a distributed system to handle the actions, which carries with it disadvantages of distributed systems, such as the potential for communication errors, downtime, and connectivity issues, among others. In contrast, aspects described herein provide an autonomous system that can run on a mobile device, reducing the errors and complexity associated with a distributed system. Implementation is made easier, faster, and less expensive, and is not dependent on a separate provider.

Figure 3:
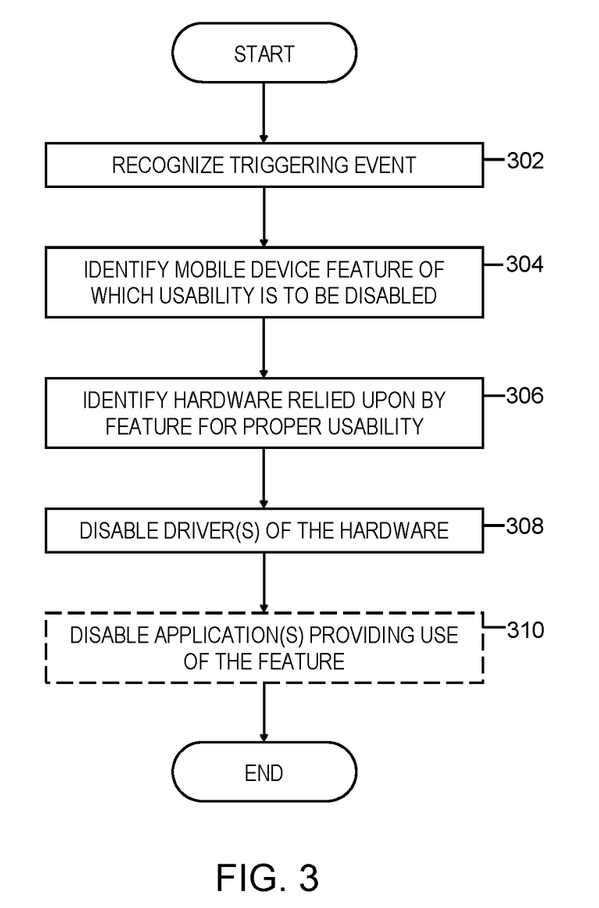
FIG. 3 depicts an example process for mobile device feature disablement, in accordance with aspects described herein.

FIG. 3 depicts an example process for mobile device feature disablement, in accordance with aspects described herein. In some examples, the process is performed by one or more computer systems, such as those described herein, which may include a mobile device, and particularly control module software installed on an operating system and/or built into a kernel of the operating system installed on the mobile device.

The process begins by recognizing a triggering event (302). The triggering event may be a geolocation-based triggering event, for instance entrance of a geofenced zone, structure, or other area. Additionally or alternatively, the triggering event may be a proximity-based triggering event, where the mobile device receives from a transmitter a command or other signal from which the mobile device identifies the feature to be disabled. The signal can identify a mobile device feature to be disabled, and the mobile device can identify the mobile device feature from the received command. Alternatively, the signal can include an identifier that the mobile device uses along with identifier-feature association information to identify a feature to be disabled.

Some embodiments of recognizing the triggering event see the mobile device checking for commands/signals from a transmitter. This may be based on an attempt by the mobile device to access hardware of the mobile device. For instance, a camera application may call to the mobile device operating system to access the camera hardware. The proximity-based triggering event may be raised based on that checking in response to the attempt by the mobile device to access the hardware.

The process continues with the mobile device identifying a mobile device feature of which usability is to be disabled (304). This could come in the form of a signal or other data received from an external device. Alternatively, it could be identified from rules or other information stored on the mobile device that indicate feature(s) to be disabled based on a detected geolocation of the mobile device, as examples.

The process then identifies one or more hardware devices of the mobile device that the mobile device feature relies on for proper usability of the feature (306). Example hardware devices include a camera, a microphone, a global positioning system antenna, a cellular modem or radio, a network adapter, a Bluetooth adapter, and/or a near-field communication chip.

In some examples, the mobile device performs the identifying the one or more hardware devices based on correlating the identified mobile device feature to the one or more hardware devices of the mobile device using a set of correlations that the mobile device maintains between mobile device features and hardware of the mobile device. As an example, the mobile device might correlate the 'Camera' feature to the forward and rear-facing cameras, and may correlate the 'Internet' feature to the WiFi, cellular, and Bluetooth adapters of the mobile device.

The process then disables one or more drivers of the one or more hardware devices (308). The disabling the one or more drivers disables usability of the mobile device feature. For instance, disabling a driver may render an operating system of the mobile device at least temporarily unable to communicate with the one or more hardware devices for usability of the mobile device feature.

In some examples, such as the 'Internet' feature example, the one or more hardware devices include a plurality of hardware devices, and the mobile device feature relies on any of the plurality of hardware devices for proper usability of the mobile device feature. In these situations, the disabling disables a respective driver for each of the plurality of hardware devices to disable usability of the mobile device feature.

Optionally, the process could also disable one or more applications, of the mobile device, providing a user use of the mobile device feature (310).

As noted, in some embodiments, the identifying the mobile device feature (304), the identifying the one or more hardware devices (306), and the disabling (308) are performed by a control module built into a kernel of an operating system installed on the mobile device. Alternatively, these aspects could be performed by a control application that is configured to run with root privilege at startup of the mobile device.

Although various examples are provided, variations are possible without departing from a spirit of the claimed aspects.

Figure 4:
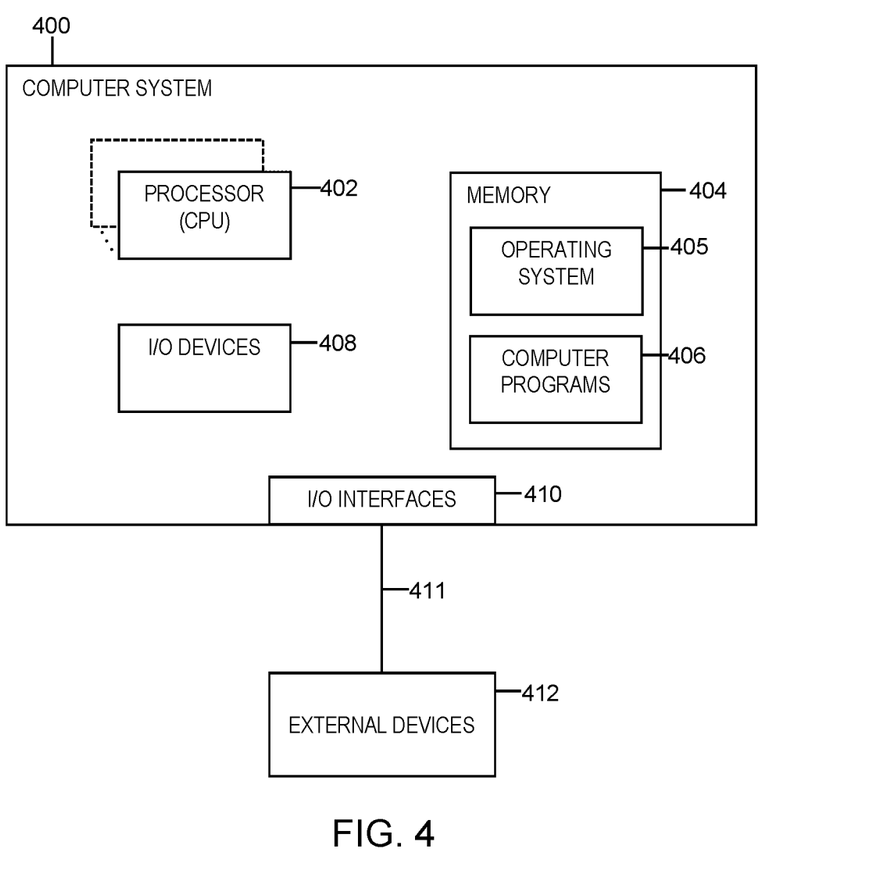
FIG. 4 depicts one example of a computer system and associated devices to incorporate and/or use aspects described herein.

Processes described herein may be performed singly or collectively by one or more computer systems, such as one or more mobile devices, as examples. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Figure 5:
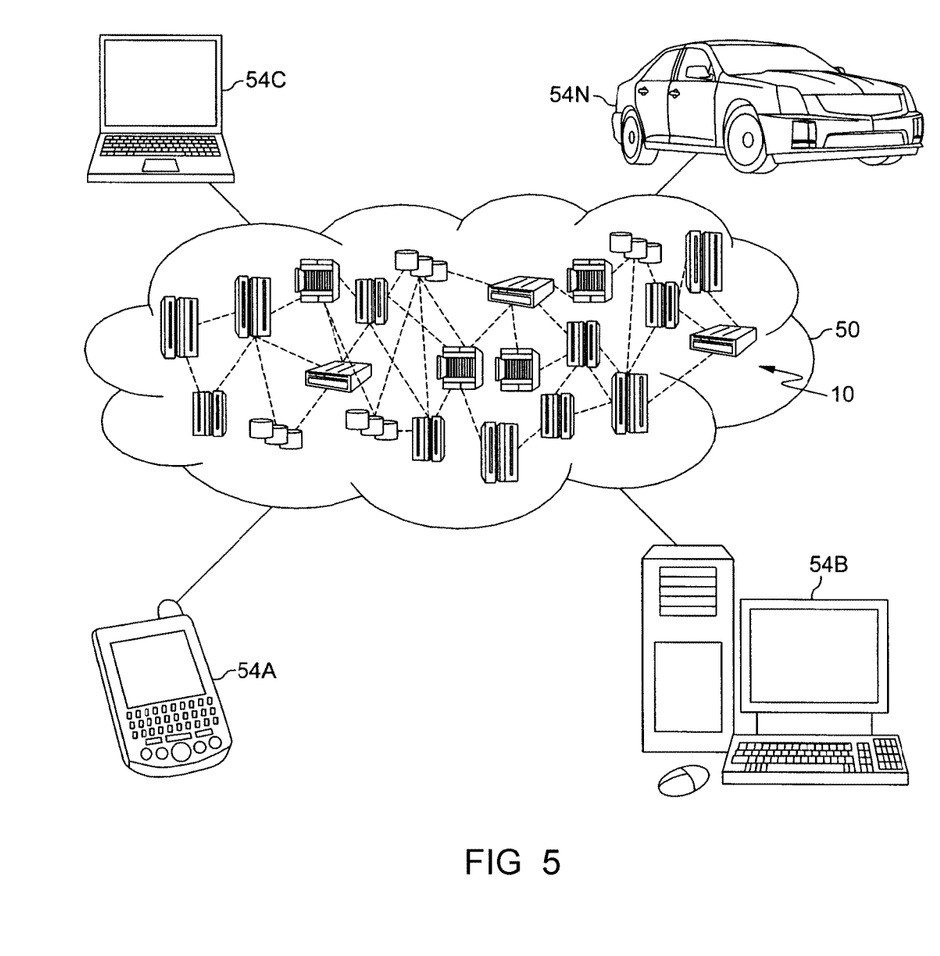
FIG. 5 depicts a cloud computing environment according to an embodiment of the present invention.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Referring now to FIG. 5, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
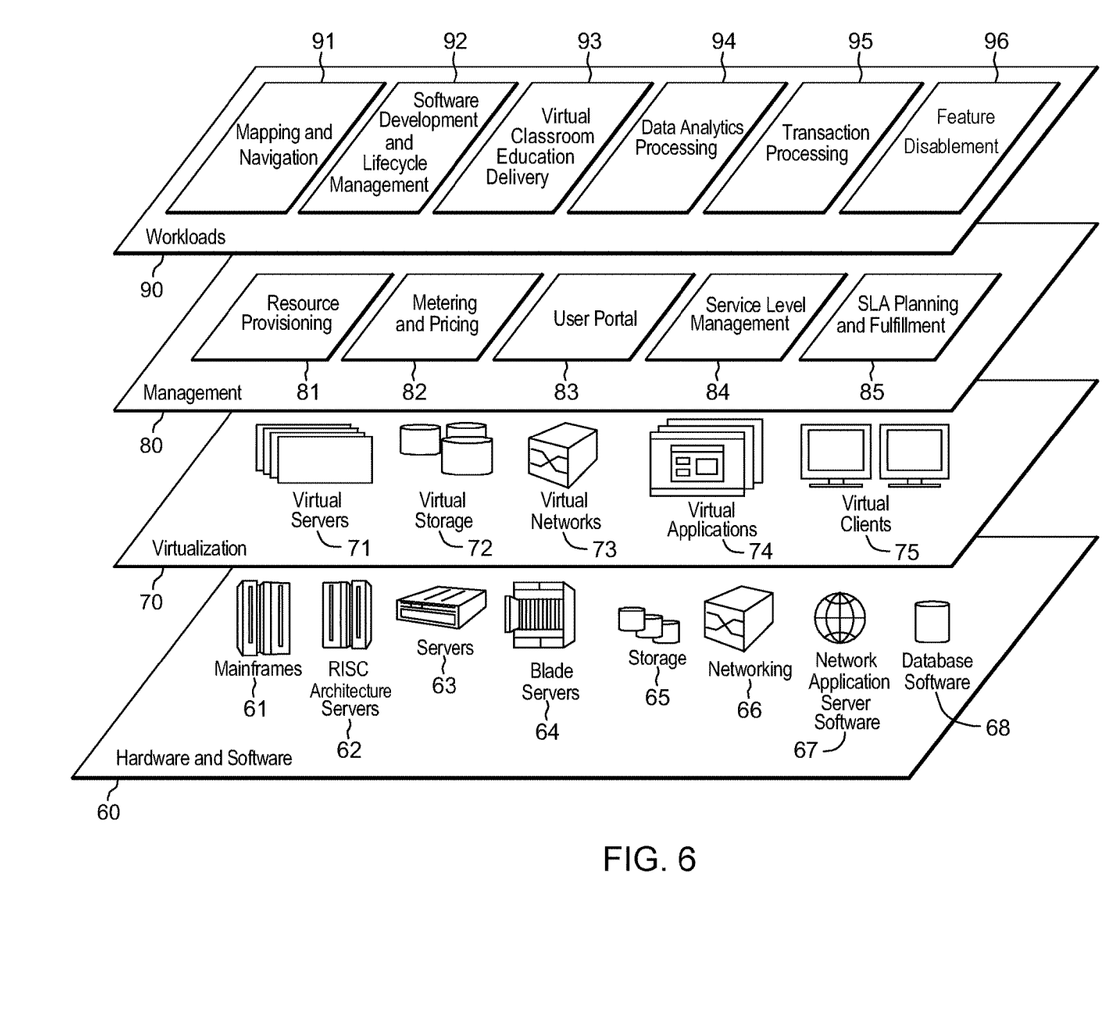
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and feature disablement 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   identifying, by a mobile device, a mobile device feature of which usability is to be disabled;
   obtaining a set of correlations between mobile device features and hardware of the mobile device;

identifying the mobile device feature in a correlation of the set of correlations, the correlation correlating the mobile device feature to one or more hardware devices of the mobile device that the mobile device feature relies on for proper usability of the feature;

identifying the one or more hardware devices from the correlation; and disabling, by the mobile device, one or more drivers of the one or more hardware devices, the disabling the one or more drivers disabling usability of the mobile device feature, wherein the disabling is performed based on identifying the one or more hardware devices, and wherein the disabling the one or more drivers renders an operating system of the mobile device at least temporarily unable to communicate with the one or more hardware devices for usability of the mobile device feature.

2. The method of claim 1, wherein the identifying the mobile device feature is based on a geolocation-based triggering event.

3. The method of claim 1, wherein the identifying the mobile device feature is based on a proximity-based triggering event, wherein the method further comprises the mobile device receiving from a transmitter a signal from which the mobile device identifies the feature to be disabled.

4. The method of claim 3, wherein the mobile device identifies the mobile device feature from the received signal, and wherein the mobile device performs the identifying the one or more hardware devices based on correlating the identified mobile device feature to the one or more hardware devices of the mobile device using the set of correlations that the mobile device maintains between mobile device features and hardware of the mobile device.

5. The method of claim 3, further comprising checking, based on an attempt by the mobile device to access hardware thereof, for signals from a transmitter, wherein the proximity-based triggering event is raised based on the checking in response to the attempt by the mobile device to access the hardware.

6. The method of claim 1, wherein the one or more hardware devices comprise a plurality of hardware devices, the mobile device feature relying on any of the plurality of hardware devices for proper usability of the mobile device feature, and wherein the disabling disables a respective driver for each of the plurality of hardware devices to disable usability of the mobile device feature.

7. The method of claim 1, wherein the identifying the mobile device feature of which usability is to be disabled, the obtaining the set of correlations, the identifying the mobile device feature in the correlation of the set of correlations, the identifying the one or more hardware devices, and the disabling are performed by a control module built into a kernel of an operating system installed on the mobile device.

8. The method of claim 1, wherein the identifying the mobile device feature of which usability is to be disabled, the obtaining the set of correlations, the identifying the mobile device feature in the correlation of the set correlations, the identifying the one or more hardware devices, and the disabling are performed by a control application configured to run with root privilege at startup of the mobile device.

9. The method of claim 1, further comprising disabling one or more applications, of the mobile device, providing a user use of the mobile device feature.

10. The method of claim 1, wherein the one or more hardware devices comprise at least one selected from the group consisting of: a camera, a microphone, a global positioning system antenna, a cellular modem or radio, a network adapter, a Bluetooth adapter, and a near-field communication chip.

11. A computer program product comprising:
a computer readable storage medium readable by at least one processor and storing instructions for execution by the at least one processor for performing a method comprising:
identifying, by a mobile device, a mobile device feature of which usability is to be disabled;
obtaining a set of correlations between mobile device features and hardware of the mobile device;
identifying the mobile device feature in a correlation of the set of correlations, the correlation correlating the mobile device feature to one or more hardware devices of the mobile device that the mobile device feature relies on for proper usability of the feature;
identifying the one or more hardware devices from the correlation; and
disabling, by the mobile device, one or more drivers of the one or more hardware devices, the disabling the one or more drivers disabling usability of the mobile device feature, wherein the disabling is performed based on identifying the one or more hardware devices, and wherein the disabling the one or more drivers renders an operating system of the mobile device at least temporarily unable to communicate with the one or more hardware devices for usability of the mobile device feature.

12. The computer program product of claim 11, wherein the identifying the mobile device feature is based on a proximity-based triggering event, wherein the method further comprises the mobile device receiving from a transmitter a signal from which the mobile device identifies the feature to be disabled.

13. The computer program product of claim 12, wherein the method further comprises checking, based on an attempt by the mobile device to access hardware thereof, for signals from a transmitter, wherein the proximity-based triggering event is raised based on the checking in response to the attempt by the mobile device to access the hardware.

14. The computer program product of claim 11, wherein the one or more hardware devices comprise a plurality of hardware devices, the mobile device feature relying on any of the plurality of hardware devices for proper usability of the mobile device feature, and wherein the disabling disables a respective driver for each of the plurality of hardware devices to disable usability of the mobile device feature.

15. A computer system comprising:
a memory; and
a processor in communication with the memory, wherein the computer system is a mobile device configured to perform a method comprising:
identifying, by the mobile device, a mobile device feature of which usability is to be disabled;
obtaining a set of correlations between mobile device features and hardware of the mobile device;
identifying the mobile device feature in a correlation of the set of correlation, the correlation correlating the mobile device feature to one or more hardware devices of the mobile device that the mobile device feature relies on for proper usability of the feature;
identifying the one or more hardware devices from the correlation; and
disabling, by the mobile device, one or more drivers of the one or more hardware devices, the disabling the one or more drivers disabling usability of the mobile device feature, wherein the disabling is performed based on identifying the one or more hardware devices, and wherein the disabling the one or more drivers renders an operating system of the mobile device at least temporarily unable to communicate with the one or more hardware devices for usability of the mobile device feature.

16. The computer system of claim 15, wherein the identifying the mobile device feature is based on a proximity-based triggering event, wherein the method further comprises the mobile device checking, based on an attempt by the mobile device to access hardware thereof, for signals from a transmitter, and receiving from a transmitter a signal that identifies the mobile device feature to be disabled, wherein the proximity-based triggering event is raised based on the checking in response to the attempt by the mobile device to access the hardware.

17. The method of claim 1, wherein the mobile device feature is provided via a combination of software and hardware, the software being one or more applications through which the mobile device feature is provided and used, and the hardware being the one or more hardware devices relied on for usability of the feature, and wherein the disabling the one or more drivers prevents the one or more applications through which the mobile device feature is used from functioning properly to achieve desired functions.

* * * * *